3,240,817
TREATMENT OF POLYPHENYL ETHER
COMPOSITIONS
Emil Herbert Carlson, Dayton, Ohio, assignor to Monsanto Company, a corporation of Delaware
No Drawing. Filed Apr. 13, 1961, Ser. No. 102,662
11 Claims. (Cl. 260—613)

This invention relates to the treatment of polyphenyl ether compositions to improve their oxidation resistance, color stability, and corrosive action.

The polyphenyl ether compositions have been found to have physical and chemical properties whereby they are particularly suitable as high-temperature functional fluids, i.e. they have excellent thermal stability, excellent oxidation stability, very good hydrolytic stability, excellent liquid range, fair pour point, good lubricity, good viscosity properties, very good radiation stability, and excellent useful life at elevated temperatures of the order of about 800° F. and higher.

The polyphenyl ethers can be illustrated by the structural formula

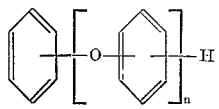

wherein $n$ is an integer from 2 to 9, and hydrocarbyl derivatives thereof wherein the number of carbon atoms in a single hydrocarbyl radical preferably does not exceed 12 and the total carbon atoms in the sum of the hydrocarbyl radicals preferably does not exceed 25, and mixtures of such polyphenyl ethers. The hydrocarbyl-substituted polyphenyl ethers preferably contain hydrocarbyl substituents wherein the carbon atom bonding said substituent to an aromatic nucleus of the polyphenyl ether is free from hydrogen atoms, for example, t-butyl, t-amyl, 1-methylcyclohexyl, α-cumyl, and like hydrocrabyl radicals. For use under extreme conditions of temperature and/or ionizing radiation the unsubstituted polyphenyl ethers are generally preferred. Furthermore the aforesaid polyphenyl ethers, as a substantially single component, preferably have all of the ether linkages in the meta position. When mixtures of polyphenyl ethers are employed it is preferred that such composition contain at least about 50 weight percent of all-meta polyphenyl ethers. However, as an alternative condition of such compositions, a major proportion of meta-linkages in the sum of the polyphenyl ether components comprising such composition is preferred, i.e. the ether meta-linkages in any mixed composition should preferably be of the order of at least about 50 percent of the total ether linkages in said mixed composition. Additionally, as to polyphenyl ethers containing other than meta linkages, the nonsymmetrical isomer components are generally preferred over the symmetrical isomer components. Furthermore, whereas ortho, meta and para ether linkages can be employed in the polyphenyl ether compositions, the linkages preferably are predominately the meta and para ether linkages. A further preferred condition is that the polyphenyl ethers are selected such that $n$ is an integer from 3 to 6 and more preferably still from 3 to 4.

The various polyphenyl ethers and mixed compositions thereof are more fully disclosed and claimed in the copending applications of Edward S. Blake and William C. Hammann, Serial No. 101,081, filed April 6, 1961; Serial No. 843,057, filed September 29, 1959 and now Patent No. 3,155,888; Serial No. 766,685, filed October 13, 1958; and Serial No. 702,767, filed December 16, 1957 and now abandoned, all of which applications are incorporated herein by reference.

The principal object of the instant invention is to prepare polyphenyl ether functional fluid compositions having improved oxidation resistance. Another object of the instant invention is to further reduce the corrosive action of the polyphenyl ether composition. A further object of the instant invention is to improve the color stability of polyphenyl ether compositions. Other objects and advantages of this invention will be apparent to those skilled in the art from the following disclosure.

It has now been found that the polyphenyl ether compositions can be further improved by treatment thereof with a mixture of copper powder and an alkali metal, preferably lithium, sodium and/or potassium, at a temperature of from above the melting point of the alkali metal, preferably above about 190° C., to about 280° C. and preferably from about 220° C. to 240° C. over a time period of from about 4 to about 10 hours or longer. Sufficient copper powder and alkali metal are employed such that a portion of these materials are present in the mixture at the conclusion of the treatment period. Generally the order of from about 0.25 to about 3.5 weight percent of sodium and from about 0.25 to about 2 weight percent of copper powder, based on the weight of the polyphenyl ether composition to be treated, is sufficient. Corresponding equivalent amounts of other alkali metals based on the ratio of their atomic weight to the atomic weight of sodium can be employed, thus on a weight percent basis, less lithium (0.3×weight sodium) and more potassium (1.70×weight sodium) would be required for a generally equivalent effect. During the treatment period the mixture is agitated in a manner to maintain the copper powder and alkali metal materials suspended in a substantially uniform manner throughout the polyphenyl ether composition. Following said treatment the mixture is filtered to remove the suspended solids, including the excess copper powder and alkali metal. The filtrate is then fractionally distilled to recover the desired polyphenyl ether composition. A minor amount of the forerun and tailings in the fractional distillation may be separated from the balance of the polyphenyl ether composition and may be combined with cuts from the treatment of similar compositions to recover a portion of such material. Normally not more than 5 weight percent of the filtrate is removed from the composition in such cuts.

It will be understood that specific components of mixed polyphenyl ether compositions can be separately treated by the present process and then mixed in any desired ratio to form the final composition. This procedure has the advantage that any cuts removed in the distillation process would not materially alter the specific treated composition and could not alter the component ratio of any desired final formulated composition.

The polyphenyl ether compositions can be further treated by suspending small amounts of charcoal, Attapulgus earth, and/or alumina therein with subsequent filtration to remove such solids. Similarly the polyphenyl ether compositions can be passed through one or more columns of the aforesaid materials. Whereas the polyphenyl ethers can be mixed with aromatic solvents, e.g. benzene, toluene, xylene, etc., to improve the fluidity of the composition in passing through such columns, with subsequent removal of such solvents, it is generally preferred that such increased fluidity be effected by heating the polyphenyl ether compositions, for example, to temperatures of the order of about 65° C. to about 100° C., or higher, either before or during treatment by suspending the aforesaid materials therein or by passing the compositions through a column of the aforesaid materials, which columns can be maintained at such elevated temperature by wrapping with an electrical heating element or other suitable means.

The polyphenyl ether compositions treated by the process of this invention have been found to have improved oxidation resistance, improved color stability and reduced corrosive action as hereinafter more fully shown. A further advantage of the process of this invention is that the polished metal discs employed in the oxidation stability tests generally remained bright throughout such tests whereas the untreated compositions often rendered such metal discs dull in appearance.

The improved polyphenyl ether compositions of the present invention are useful as functional fluids particularly at elevated temperatures, for example, as synthetic lubricants for jet engines, as hydraulic fluids and lubricants for supersonic aircraft and missiles, as coolants for electronic equipment, as dielectric materials for use in the preparation of insulating elements for use in various electrical apparatus such as electrical capacitors, as coolant-moderators and heat-transfer agents for nuclear reactors, and the like.

The following examples are illustrative of the polyphenyl ether treatment process of the instant invention.

*Example 1*

A mixed polyphenyl ether composition prepared by the reaction of potassium m-phenoxyphenoxide and potassium p-phenoxyphenoxide, in a mole ratio of 4:1 and in a combined amount of a small excess over 1 mole, with 0.5 mole of m-dihalobenzene was evaluated by vapor phase chromatographic analysis and found to consist of about 57 weight percent of m-bis(m-phenoxyphenoxy)benzene, about 38 weight percent of m-(m-phenoxyphenoxy)phenyl p-phenoxyphenyl ether, and about 5 weight percent of m-bis(p-phenoxyphenoxy)benzene.

A 412 g. sample of the above polyphenyl ether composition and 5 g. of metallic sodium were charged into a 1-liter, round-bottom flask and heated to about 230° C. Then 2 g. of copper powder was added thereto and the mixture agitated by stirring for a period of about 6 hours during which time the temperature was held at from about 230° C. to about 240° C. The reaction mixture was then filtered to remove the solids and the filtrate distilled through an 11-inch Vigreux column. The fraction boiling at 263° to 270° C./0.3 mm. was collected, redistilled, and the product filtered through a bed of Attapulgus earth on Celite. The nearly water-white fluid had a refractive index of $n_D^{25}$ 1.6303.

The untreated polyphenyl ether was then evaluated for oxidation stability by introducing 24.69 g. thereof into the sample tube, fitted with a submerged air tube containing aluminum, copper, stainless steel, titanium, and silver metal discs spaced thereon, and placing the sample tube in a constant temeprature bath at 600° F. for 24 hours while passing 1 liter/hour of dry air through the sample. Then the sample was cooled and its viscosity in centistokes at 100° F. and 210° F., essentially according to procedure ASTM–D445–53T, determined and compared with the corresponding viscosity measurements prior to exposure under the severe oxidation conditions at 600° F. Similar viscosity evaluations before and after the exposure to oxidation, wherein a 22.49 g. sample of the composition was employed in the oxidation test, were run on the treated polyphenyl ether composition described above and all results summarized as follows:

|  | Untreated | Treated |
| --- | --- | --- |
| Viscosity 100° F. (Before) | 363.2 | 364.1 |
| Viscosity 100° F. (After) | 469.0 | 406.0 |
| Percent Viscosity Change | 29.2 | 11.5 |
| Percent Improvement Treated Material |  | 154 |
| Viscosity 210° F. (Before) | 13.11 | 13.19 |
| Viscosity 210° F. (After) | 14.60 | 13.69 |
| Percent Viscosity Change | 11.3 | 3.6 |
| Percent Improvement Treated Material |  | 214 |

In a similar evaluation using 5 times the sample size of the untreated and the treated compositions at 600° F. for 48 hours with 5 liters/hour of dry air in the presence of magnesium, aluminum, copper, steel, titanium, and silver the metal attack in mg./cm.$^2$ was determined and found to be as follows:

|  | Untreated | Treated |
| --- | --- | --- |
| Magnesium | +0.02 | −0.01 |
| Aluminum | [1][2] +0.32 | 0 |
| Copper | [1][3] −1.01 | [1][3] +0.01 |
| Steel | [1][2] +0.03 | [2] +0.04 |
| Titanium | [1][4] +0.02 | −0.01 |
| Silver | [1][3] +0.14 | −0.01 |

[1] Pit or etch.
[2] Dark stain.
[3] Deposit or coat.
[4] Light stain.

*Example 2*

A similar mixed polyphenyl ether composition to that of Example 1 was prepared and found to consist of about 63.8 weight percent of m-bis(m-phenoxyphenoxy)benzene, about 32.8 weight percent of m-(m-phenoxyphenoxy)phenly p-phenoxyphenyl ether, and about 3.4 weight percent of m-bis(p-phenoxyphenoxy)benzene.

A 205 g. sample of the above polyphenyl ether composition was charged into a 500 ml., round-bottom flask and heated to about 220° C. Then 1 g. of copper powder was added thereto and the mixture agitated by stirring for a period of about 6 hours while the temperature was maintained between about 220° and about 240° C. The mixture was then cooled to below 100° C. and filtered through a bed of Attapulgus earth on a Celite filter precoat. The filtrate was distilled through an 11-inch Vigreux column and the yellow colored fluid boiling at 286° to 291° C./0.8 mm. recovered. This fluid was again filtered through a bed of Attapulgus on a Celite filter precoat and the light yellow colored filtrate was found to have a refractive index of $n_D^{25}$ 1.6301.

*Example 3*

A 251 g. sample of the untreated polyphenyl ether composition of Example 2 was charged into a 500 ml., round-bottom flask and 3 g. of metallic sodium was added thereto. The mixture was heated to 230 and the temperature maintained between about 230° and about 240° C. for a period of about 6 hours during which time the mixture was agitated by stirring. The mixture was then cooled to below 100° C. and filtered through a bed of Attapulgus earth on a Celite filter precoat. The filtrate was distilled through an 11-inch Vigreux column and the fraction boiling at 263° to 267.5° C./0.25 to 0.3 mm. recovered. This fluid was again filtered through a bed of Attapulgus earth on a Celite filter precoat and the light straw colored filtrate was found to have a refractive index of $n_D^{25}$ 1.6301.

*Example 4*

The untreated polyphenyl ether composition of Example 2, the copper-treated product of Example 2, and the sodium-treated product of Example 3, respectively 22.71 g., 23.05 g. and 22.60 g. samples, were then subjected to oxidation conditions by bubbling 1 liter/hour of dry air through the samples at 600° F. for 48 hours in the presence of polished metal discs of magnesium, aluminum, copper, stainless steel, titanium, and silver. Then unoxidized and oxidized samples of each of the three materials were evaluated by determining their viscosity in centistokes at 100° F. and 210° F. with the following results:

| | Untreated Control | Copper Treated | Sodium Treated |
|---|---|---|---|
| Percent Weight loss during oxidation test | 0.88 | 0.74 | 0.66 |
| Viscosity 100° F. (Before) | 357.5 | 357.4 | 363.3 |
| Viscosity 100° F. (After) | 602.6 | 593.4 | 583.4 |
| Percent Viscosity Change | 68.5 | 66.1 | 60.6 |
| Percent Improvement Treated Material | | 3.6 | 13.0 |
| Viscosity 210° F. (Before) | 13.02 | 13.10 | 13.17 |
| Viscosity 210° F. (After) | 16.45 | 16.37 | 16.23 |
| Percent Viscosity Change | 26.4 | 25.0 | 23.2 |
| Percent Improvement Treated Material | | 5.6 | 13.8 |

From the percent improvement of the treated material over the untreated material, i.e. the difference in percent viscosity change between the treated and untreated material, based on the treated material, it will be seen that treatment with copper alone effects a small improvement, treatment with an alkali metal alone, such as sodium, effects a somewhat larger improvement, but the treatment with the combination of copper and sodium together effects a much gerater improvement than the additive improvements of copper and sodium alone (see Example 1). Accordingly, the combination of copper and alkali metal together are seen to effect a synergistic improvement in the oxidative stability of polyphenyl ethers.

Additionally after a period of several months storage it was observed that the composition treated with the combination of copper powder and sodium metal (Example 1) remained substantially water-white, the sample treated with sodium metal alone (Example 3) became a somewhat darker straw color, and the sample treated with copper powder alone (Example 2) became a much brighter yellow color. Accordingly, it is seen that the process of the instant invention also effects a marked improvement in color stability of the polyphenyl ether compositions.

*Example 5*

Another mixed polyphenyl ether composition was prepared and consisted primarily of a mixture of m-bis(m-phenoxyphenoxy)benzene, m - (m - phenoxyphenoxy) phenyl p-phenoxyphenyl ether and m-bis(p-phenoxyphenoxy)benzene. A portion of this composition was treated with metallic sodium and copper powder in a similar manner to that set forth in Example 1, and the untreated and treated compositions, respectively 23.08 g. and 23.85 g. samples, were subjected to oxidation conditions as set out in Example 4, with the following results:

| | Untreated | Treated |
|---|---|---|
| Viscosity 100° F. (Before) | 378.2 | 365.1 |
| Viscosity 100° F. (After) | 690.5 | 464.1 |
| Percent Viscosity Change | 82.6 | 27.1 |
| Percent Improvement Treated Material | | 205 |
| Viscosity 210° F. (Before) | 13.28 | 13.24 |
| Viscosity 210° F. (After) | 17.47 | 14.62 |
| Percent Viscosity Change | 31.5 | 10.5 |
| Percent Improvement Treated Material | | 200 |

*Example 6*

A 425 g. sample of m-bis(m-phenoxyphenoxy)benzene was introduced into a 1-liter, round-bottom flask and 5 g. of metallic sodium added thereto. The mixture was heated to about 230° C., then 2 g. of copper powder was introduced into the mixture. The mixture was maintained at from about 230° to about 240° C. for 4.5 hours while being stirred vigorously to keep the copper powder and sodium suspended therein. The mixture was then filtered through a Celite filter bed and the filtrate distilled through an 11-inch Vigreux column. The fraction boiling at 280° to 292° C./0.75 to 1.2 mm. was recovered and redistilled at 267° to 272° C./0.5 mm., which product had a refractive index of $n_D^{25}$ 1.6297. The treated polyphenyl ether was then filtered through a bed of Attapulgus earth on a Celite filter precoat to obtain the water-white fluid product. Then the untreated and treated products, respectively 23.75 g. and 23.98 g. samples, were subjected to the oxidation conditions as set out in Example 1, with the following results:

| | Untreated | Treated |
|---|---|---|
| Viscosity 100° F. (Before) | 360.5 | 341.3 |
| Viscosity 100° F. (After) | 493.3 | 399.5 |
| Percent Viscosity Change | 36.9 | 17.1 |
| Percent Improvement Treated Material | | 102 |
| Viscosity 210° F. (Before) | 13.03 | 12.76 |
| Viscosity 210° F. (After) | 15.03 | 13.68 |
| Percent Viscosity Change | 15.4 | 7.2 |
| Percent Improvement Treated Material | | 101 |

After the above sodium metal together with copper powder treatment had been effected it was found that the halogen content of the polyphenyl ether was reduced from about 0.008 percent to about 0.002 percent.

Whereas copper powder is generally preferred in the above-described process, as having a large surface area in relation to the weight of copper employed, other relatively finely divided forms of copper can also be employed, e.g. granulated copper, small copper beads, copper turnings, copper chips, and the like.

Additionally the process of this invention can be made continuous by passing a preheated polyphenyl ether composition through a series of heated packed columns containing copper, preferably in the larger particle size, e.g. copper turnings and copper chips, together with the alkali metal. The packed columns preferably are supported on a filter bed media to retain the salts formed in the purification process. Since the system is held at a temperature above the melting point of the alkali metal, it may be desirable to gradually add additional alkali metal to one or more of the columns, and particularly to the first column, in the series. As the process continues, the first packed column periodically is taken out of service and a fresh, packed column introduced as the last member of the series, whereby each column advances from last to first in order to provide the last columns in a relatively fresh condition at all times. The polyphenyl ether composition can be filtered and reheated, if desired, after passage through each of the columns in the series and prior to introduction into the next column of the series. In this regard the polyphenyl ether composition can be cooled to effect the solidification of any alkali metal therein prior to filtration and the polphenyl ether composition reheated to the desired temperature before introducing into the next column of the series. Accordingly, it will be apparent that many minor variants can be employed in the aforesaid continuous process.

It should be recognized that the forced passage of large volumes of air (1 liter/hour) through a relatively small volume of the polyphenyl ether composition (about 20 ml.) at the high temperature of 600° F. is generally far more severe than would be encountered in the actual use of such compositions as functional fluids and lubricants, since normal use would be in an essentially closed system, whereby the compositions would not be exposed to large volumes of air in relation to the volume of such compositions.

It will be apparent to those skilled in the art that the process of this invention should be carried out in a closed anhydrous system to reduce the hazards of handling the molten alkali metals.

We claim:

1. A process of treating a polyphenyl ether composition to improve the oxidation resistance thereof at elevated temperatures comprising heating a polyphenyl ether composition selected from the group consisting of: (a) polyphenyl ethers having the structural formula

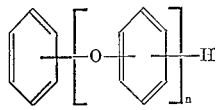

wherein $n$ is an interger from 2 to 9, (b) hydrocarbyl derivatives of said polyphenyl ethers wherein the number of carbon atoms in a single hydrocarbyl radical bonded to an aromatic nucleus of the polyphenyl ether does not exceed 12 and the total carbon atoms in the sum of the said hydrocarbyl radicals does not exceed 25, and (c) mixtures of said polyphenyl ethers of (a) and (b); in the presence of an alkali metal and finely divided copper, in an amount such that a portion of the alkali metal and finely divided copper remain in the system at the end of the process, at a temperature of from the melting point of the alkali metal to about 280° C. and separating the treated fluid polyphenyl ether composition from any suspended solids.

2. The process of claim 1, wherein the alkali metal is a mixture of alkali metals.

3. The process of claim 1, wherein the alkali metal is lithium.

4. The process of claim 1, wherein the alkali metal is sodium.

5. The process of claim 1, wherein the alkali metal is potassium.

6. The process of claim 1, wherein the alkali metal is present in an amount of from about 0.25 to about 3.5 weight percent, based on sodium, and equivalent weights of other alkali metals, the copper powder is present in an amount of from about 0.25 to about 2 weight percent, each based on the weight of the polyphenyl ether composition, the treatment temperature is from about 220° C. to about 240° C., the alkali metal and copper powder are suspended in a substantially uniform manner by agitation during the treatment period, the treated mixture is filtered to remove the solids and the filtrate is fractionally distilled under reduced pressure, wherein a minor amount of the forerun and tailings of such distillation of the filtrate is separated from the balance of the polyphenyl ether composition recovered thereby.

7. The process of claim 1, wherein the polyphenyl ether composition is filtered at a temperature of from about 65° C. to about 100° C. and the polyphenyl ether is treated by contact with members selected from the group consisting of charcoal, Attapulgus earth, alumina, and mixtures thereof.

8. The process of claim 1, wherein the carbon atom bonding any hydrocarbyl radical to said aromatic nucleus of the polyphenyl ether of (b) is a tertiary carbon atom and at least about 50 percent of the total ether linkages in the polyphenyl ether composition are meta-linkages.

9. The process of claim 1, wherein an unsubstituted polyphenyl ether composition of (a) is employed and at least about 50 percent of the total ether linkages in the polyphenyl ether composition are meta-linkages.

10. The process of claim 9, wherein $n$ is an integer from 3 to 6.

11. The process of claim 9, wherein $n$ is an integer from 3 to 4.

References Cited by the Examiner

UNITED STATES PATENTS 2,940,929　6/1960　Diamond _____ 260—613 X
3,006,852　10/1961　Barnum et al. ____ 260—613 X

OTHER REFERENCES

Kotera: Chemical Abstracts, vol. 45 (1951), page 6598.

LEON ZITVER, *Primary Examiner.*

CHARLES B. PARKER, *Examiner.*